United States Patent
Maurer et al.

(10) Patent No.: US 12,196,586 B2
(45) Date of Patent: Jan. 14, 2025

(54) SPRAY FLOW SENSING WITH OPTICAL SIGNATURE ANALYSIS

(71) Applicant: Intelligent Agricultural Solutions LLC, Fargo, ND (US)

(72) Inventors: Garrett Maurer, Moorhead, MN (US); Justin Jee, Fargo, ND (US); Dan Bjertness, Fargo, ND (US); Ross Eickhoff, Fargo, ND (US)

(73) Assignee: Intelligent Agricultural Solutions LLC, Fargo, ND (US)

( * ) Notice: Subject to any disclaimer, the term of this patent is extended or adjusted under 35 U.S.C. 154(b) by 0 days.

(21) Appl. No.: 17/813,486

(22) Filed: Jul. 19, 2022

(65) Prior Publication Data

US 2023/0025158 A1    Jan. 26, 2023

Related U.S. Application Data

(60) Provisional application No. 63/224,119, filed on Jul. 21, 2021, provisional application No. 63/224,200, filed on Jul. 21, 2021.

(51) Int. Cl.
*G01F 1/10* (2006.01)
*G01F 1/32* (2022.01)
*A01M 7/00* (2006.01)

(52) U.S. Cl.
CPC ............ *G01F 1/103* (2013.01); *G01F 1/3236* (2013.01); *A01M 7/0042* (2013.01)

(58) Field of Classification Search
CPC . G01F 1/32; G01F 1/3209; G01F 1/10; G01F 1/103
See application file for complete search history.

(56) References Cited

U.S. PATENT DOCUMENTS

| | | | |
|---|---|---|---|
| 3,934,473 A | 1/1976 | Griffo | |
| 4,441,505 A * | 4/1984 | Edwards | A61B 5/09 600/539 |
| 5,388,466 A | 2/1995 | Teunissen | |
| 5,866,824 A * | 2/1999 | Schieber | G01F 1/125 73/861.79 |
| 10,827,740 B2 | 11/2020 | Wonderlich et al. | |
| 2010/0185394 A1 | 7/2010 | Wu et al. | |
| 2020/0196520 A1 | 6/2020 | Schoeny et al. | |
| 2020/0355527 A1 | 11/2020 | Scilingo | |

FOREIGN PATENT DOCUMENTS

| | | |
|---|---|---|
| WO | 2016035037 A1 | 3/2016 |
| WO | 2021067739 A2 | 4/2021 |

OTHER PUBLICATIONS

European Patent Office, International Search Report related to International Patent Application No. PCT/IB2022/054759, mail date Aug. 23, 2022.

* cited by examiner

*Primary Examiner* — Erika J. Villaluna

(57) ABSTRACT

An optical flow rate sensor system for a sprayer includes an optical sensor, an optical sensor window within a display housing, a projectile within a drum housing, and vortexing geometry upstream of the projectile. The optical sensor is located adjacent to the optical sensor window. The projectile includes a first section having a first optical absorption value and a second section having a second optical absorption value that is lower than the first optical absorption value. The projectile is configured to revolve around an axis of the drum housing.

16 Claims, 14 Drawing Sheets

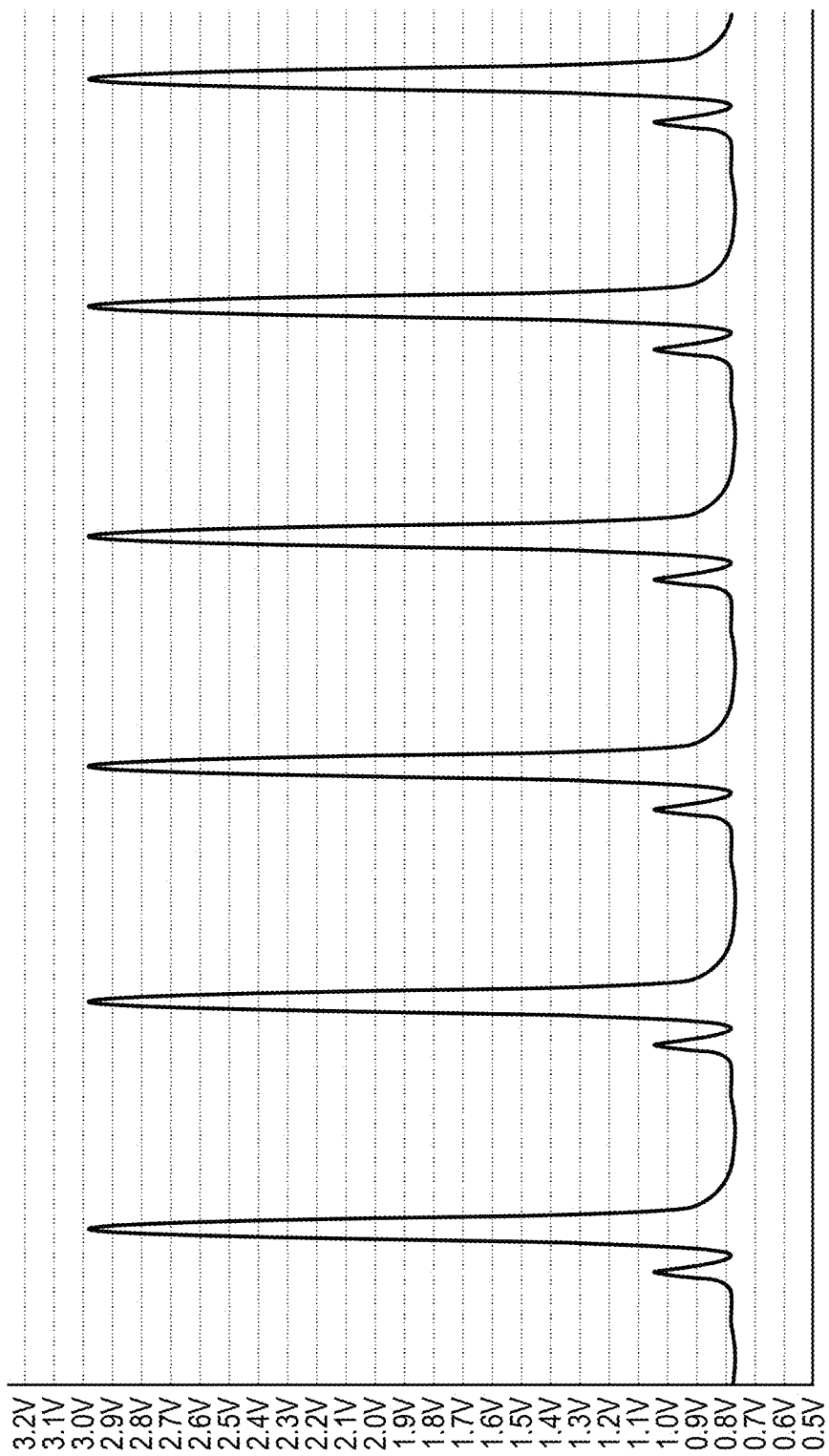

SPRAY FLOW SENSING WITH OPTICAL SIGNATURE ANALYSIS

CROSS-REFERENCE TO RELATED APPLICATIONS

This application claims the benefit of the filing date of U.S. Provisional Patent Application 63/224,200, "Spray Flow Sensing with Optical Signature Analysis," and U.S. Provisional Patent Application 63/224,119, "Spray Monitoring System," each filed Jul. 21, 2021, the entire disclosure of each of which is incorporated herein by reference.

TECHNICAL FIELD

The present disclosure relates generally to agricultural sprayers, and more specifically to an optical sensor system for measuring the flow rate of an agricultural sprayer.

BACKGROUND

It is desirable to measure the flow rate of an agricultural sprayer to monitor the amount of fluid, such as a pesticide, being sprayed in a particular area and ensure spray nozzle integrity. Overuse of pesticides can lead to product waste and adverse environmental outcomes, while underuse of pesticides can cause an area to be inadequately treated and in some instances can contribute to increasing pesticide resistance.

BRIEF SUMMARY

In some embodiments, an optical flow rate sensor system for an agricultural sprayer includes a drum housing, a central passage housing, an optical sensor, an optical sensor window, and a projectile. The drum housing and central passage housing together define a first flow path comprising a first portion generally parallel to an axis and a second vortex portion around the axis. The optical sensor is disposed facing the axis. The optical sensor window is within a display housing and is disposed between the axis and the optical sensor. The projectile comprises a first section having a first optical absorption value and a second section having a second optical absorption value that is lower than the first optical absorption value. The projectile is configured to revolve around about the axis when fluid flows through the first flow path.

Another embodiment includes a method of testing an optical flow rate sensor system for an agricultural sprayer. The method includes directing, with a drum housing and a central passage housing, a fluid along a vortex flow path within the drum housing and around an axis. A projectile revolves within the drum housing and around the axis. An optical sensor emits a light beam through an optical sensor window and toward the axis. A portion of the light beam is reflected off of the projectile. The optical sensor receives the portion of the light beam reflected off of the projectile. The optical sensor communicates data about the reflected light to a controller. The controller generates transmittance data and absorption data about the fluid and the projectile. The controller assesses a speed of the projectile about the axis to calculate a flow rate of the fluid along the vortex flow path.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

FIG. 8A is a graph of an oscilloscope reading of the bi-sectional projectile of FIG. 6A in a clear fluid.

Figure 1A:
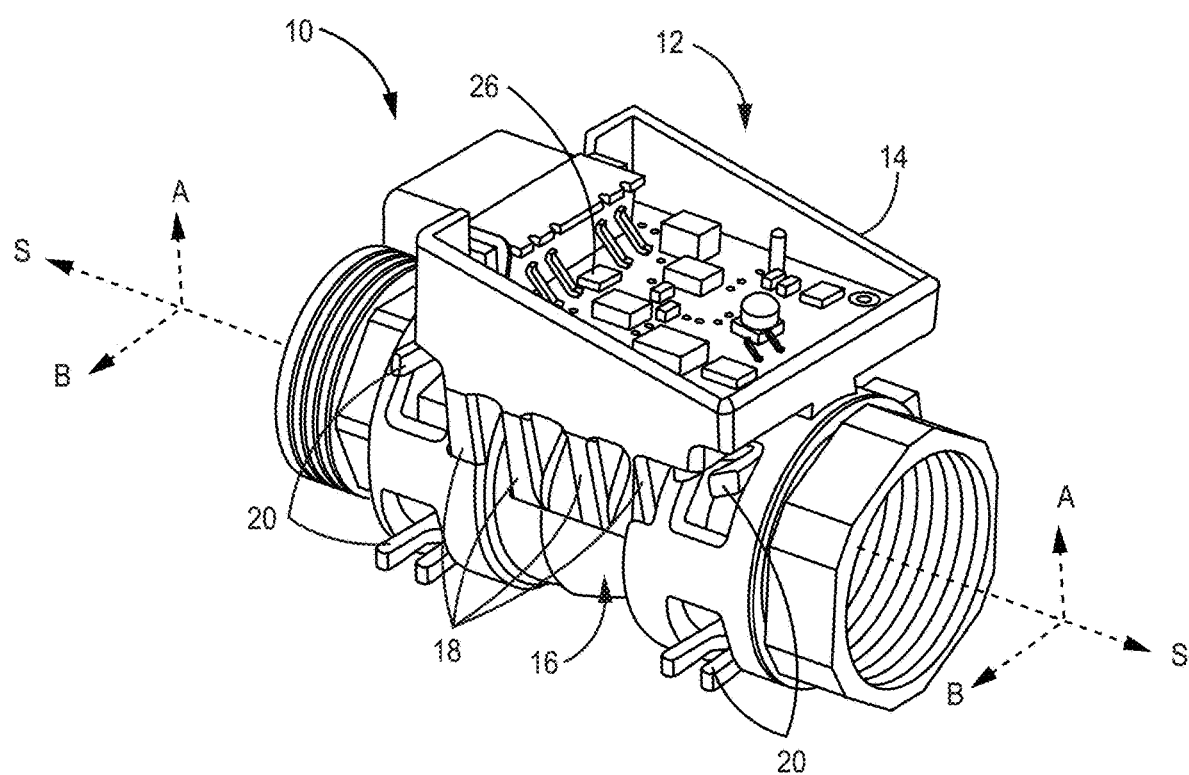
FIG. 1A is a front perspective view of an optical flow rate sensor system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments may include features and components not specifically shown in the drawings.

DETAILED DESCRIPTION

An optical flow rate sensor for a sprayer uses an arc-shaped projectile in combination with a vortexing geometry to measure the flow rate of a fluid through the sprayer. As used herein, the term "projectile" refers to a rotary optical encoder element. The arc-shaped projectile includes at least two sections with dissimilar transmittance and absorption values, which provides a lower-noise optical signal than a uniform projectile and allows for more accurate readings across a wide range of fluid opacity. The vortexing geometry is provided by the shape of a section of the sprayer, and creates a vortex flow that allows for more accurate readings across a wide range of fluid flow rates.

During testing of the optical sensor, a test fluid is passed through the sprayer. This test fluid can have an amount of clay present in it to test the optical sensor's readings of the flow rate at a particular opacity. The amount of clay in the test fluid can be varied to check the optical sensor's readings across a range of fluid opacities. A consistent reading from the optical sensor (i.e., a fairly constant flow rate reading across a range of fluid opacities) would signal that the optical sensor is calibrated properly and producing accurate measurements. As described in further detail below, the use of a projectile which is uniform in color can lead to a low signal-to-noise ratio at some fluid opacities, making it difficult to discern if the optical sensor is calibrated properly. A projectile which contains two or more sections which have different optical transmittance/absorption values can increase the signal-to-noise ratio at these fluid opacities, allowing the optical sensor to produce accurate flow rate measurements across the tested range of opacities. The characteristic optical signature of a multi-sectional projectile improves signal strength relative to noise, permitting more accurate measurements despite fluid opacity.

Figure 1B:
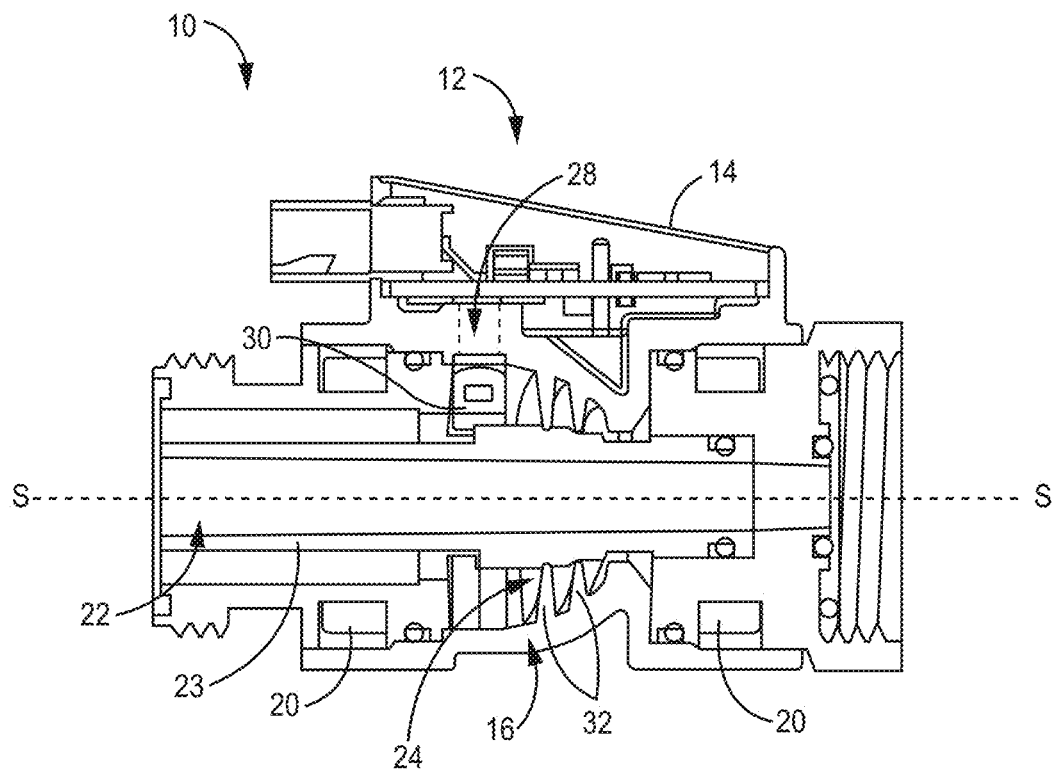
FIG. 1B is a cross-sectional view of the system of FIG. 1A along a central plane.
Figure 1C:
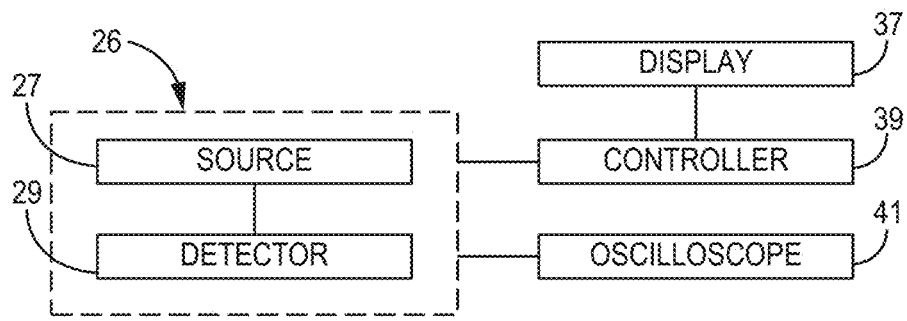
FIG. 1C is a schematic depiction of an optical sensor and controller.
Figure 2:
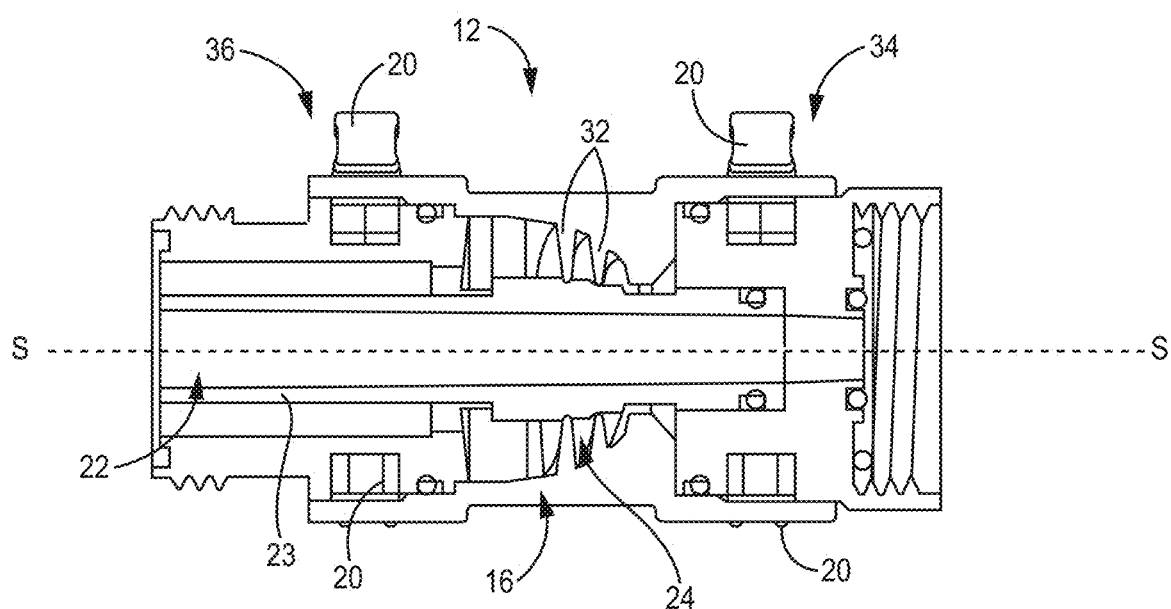
FIG. 2 is a cross-sectional view of the system of FIG. 1A taken orthogonal to the cross-sectional view of FIG. 1B.

FIG. 1A is a perspective view of an optical flow rate sensor system 10 including an optical sensor 26. FIG. 1B is a cross-sectional view of sensor system 10 taken along plane A-A. FIG. 1C is a schematic depiction of optical sensor 26. FIG. 2 is a cross-sectional view of sensor system 10 of FIG. 1A taken along plane B-B, which is orthogonal to plane A-A. Sensor system 10 includes optical sensor section 12, display housing 14, drum housing 16, splines 18, clips 20, and central passage housing 23. Optical sensor section 12 includes optical sensor 26, optical sensor window 28, and projectile 30. Drum housing 16 has interior walls 32 defining a vortex flow path 24. Drum housing 16 includes first end 34 and second end 36. Sensor system 10 is oriented along axis S-S, which is in plane A-A. Sensor system 10 can additionally include a controller, such as controller 39 (shown in FIG. 1C).

The axial direction of fluid movement through sensor system 10 is along axis S-S, such that one or more flow paths through sensor system 10 define axis S-S. Optical sensor section 12 is oriented axially along axis S-S and can be located adjacent to a housing section that contains components for routing fluid towards a spray nozzle. Optical sensor section 12 includes the components of sensor system 10 which allow for the flow rate of a fluid within sensor system 10 to be measured with an optical sensor, such as optical sensor 26. Drum housing 16 extends axially along axis S-S and defines an approximately hemispheric interior shape. Drum housing 16 defines a cavity therein that defines the vortex flow path 24. Interior walls 32 extend from inner surface 33 of drum housing 16 (shown in FIG. 3A), and interior walls 32 can extend both circumferentially around inner surface 33 and axially along drum housing 16 with respect to axis S-S. In the example depicted in FIGS. 1A-2, interior walls 32 form a vortexing geometry within drum housing 16.

Display housing 14 can be mounted to drum housing 16 such that display housing 14 is adjacent to drum housing 16 and central passage housing 23 during operation of sensor system 10. Display housing 14 is configured to receive a display, such as display 37 (shown schematically in FIG. 1C). Display 37 can be a screen or other user interface device configured to communicate information about the operation of sensor system 10 to a user. This information can include flow rate of a fluid within sensor system 10. Optical sensor 26 can be located adjacent to a bottom side of display housing 14 with respect to the drum housing 16. Optical sensor window 28 can be an opening that extends through display housing 14 and drum housing 16. As described in more detail below, optical sensor 26 can be located adjacent to optical sensor window 28 such that optical sensor 26 can detect the movement of projectile 30 within drum housing 16. In the example depicted in FIG. 1B, projectile 30 is a rigid encoder element disposed to revolve about axis S-S within drum housing 16. As described further hereinafter, projectile 30 rotates under torque applied by fluid flow through sensor system 10, providing an indicator of flow rate. Projectile 30 can be one color, consist of one material, or otherwise have a uniform appearance. Projectile 30 can be, for example, a spherical ball or torus, or portion thereof, and can be one color and made of one material.

Splines 18 extend from display housing 14 to support and stabilize display housing 14 above drum housing 16. Clips 20 secure drum housing 16 about central passage 22 such that drum housing 16 is connected to central passage housing 23. Central passage 22 extends axially within sensor system 10 with respect to axis S-S.

As described in more detail below, fluid flows through drum housing 16 along the vortex flow path 24 defined by interior walls 32 and inner surface 33 such that the fluid is directed to travel in the vortex flow path around central passage 22. The fluid then is directed into central passage 22 and flows in the opposite direction to eventually be routed out of the sensor system 10 (e.g., to a spray nozzle). Optical sensor 26 is configured to emit a light beam to detect one or more targets and can include a source, such as source 27, which emits the light beam. Source 27 can be an LED configured to emit a light beam in the infrared light range (i.e., a light beam having a wavelength of between approximately 700 nanometers and approximately 1 millimeter). The one or more targets can be, for example, projectile 30, which rotates within drum housing 16 as fluid passes through sensor system 10. Optical sensor 26 is also configured to receive the light beam after the light beam is reflected off the target and can include a detector, such as detector 29, which receives the light beam. Detector 29 can be a photodiode capable of receiving infrared light. Optical sensor 26 can be further configured to communicate data about the reflected light beam to controller 39. Controller 39 can be a processor. Controller 39 and optical sensor 26 can form one component, or controller 39 can be separate from optical sensor 26. Controller 39 can be configured to generate transmittance data and absorption data about the fluid and the target. Controller 39 can be further configured to assess the speed of the target and calculate a flow rate of the fluid within drum housing 16. In this way, optical sensor 26 and controller 39 can detect and analyze the movement of a target, such as projectile 30, within drum housing 16. Controller 39 can be further configured to communicate with a display, such as display 37, the flow rate of the fluid along vortex flow path 24, and display 37 can be configured to display the flow rate of the fluid along vortex flow path 24. In some examples, optical sensor 26 can be configured to communicate data about the reflected light beam to an oscilloscope 41. Oscilloscope 41 and display 37 and/or controller 39 can form one component, or oscilloscope 41 can be separate from both display 37 and controller 39.

During operation of sensor system 10, fluid flows through optical sensor section 12. Fluid enters first end 34 of drum housing 16 and flows in a direction parallel to axis S-S (i.e., along the first flow path). The fluid then is directed in the vortex flow path 24 by interior walls 32. This vortex flow path 24 is characterized by having both an axial component (towards second end 36 of drum housing 16) and a circumferential component (about inner circumference 38 of drum housing 16, shown in FIG. 5A). The interior geometry of drum housing 16 (i.e., interior walls 32) and the exterior of central passage housing 23 together define the vortex flow path 24 that pre-vortexes fluid incident upon projectile 30. As a consequence of the vortexing geometry of interior walls 32, fluid contacts projectile 30 at a vector velocity with a substantial circumferential component, improving responsiveness (i.e., revolution about axis S-S) of projectile 30 at high and low fluid flow rates. More specifically, this vortexing increases torque on projectile 30, helping to more readily overcome static friction to rotate projectile 30 even at low fluid flow rates. The fluid arrives at second end 36, flows into central passage 22, and flows through central passage 22 towards first end 34. The fluid can then be routed to an outlet of sensor system 10, such as a spray nozzle. The movement of fluid through optical sensor section 12 drives the revolution of projectile 30 about axis S-S by moving projectile 30 along the portion of the vortex flow path 24 illustrated by inner circumference 38.

Figure 3:
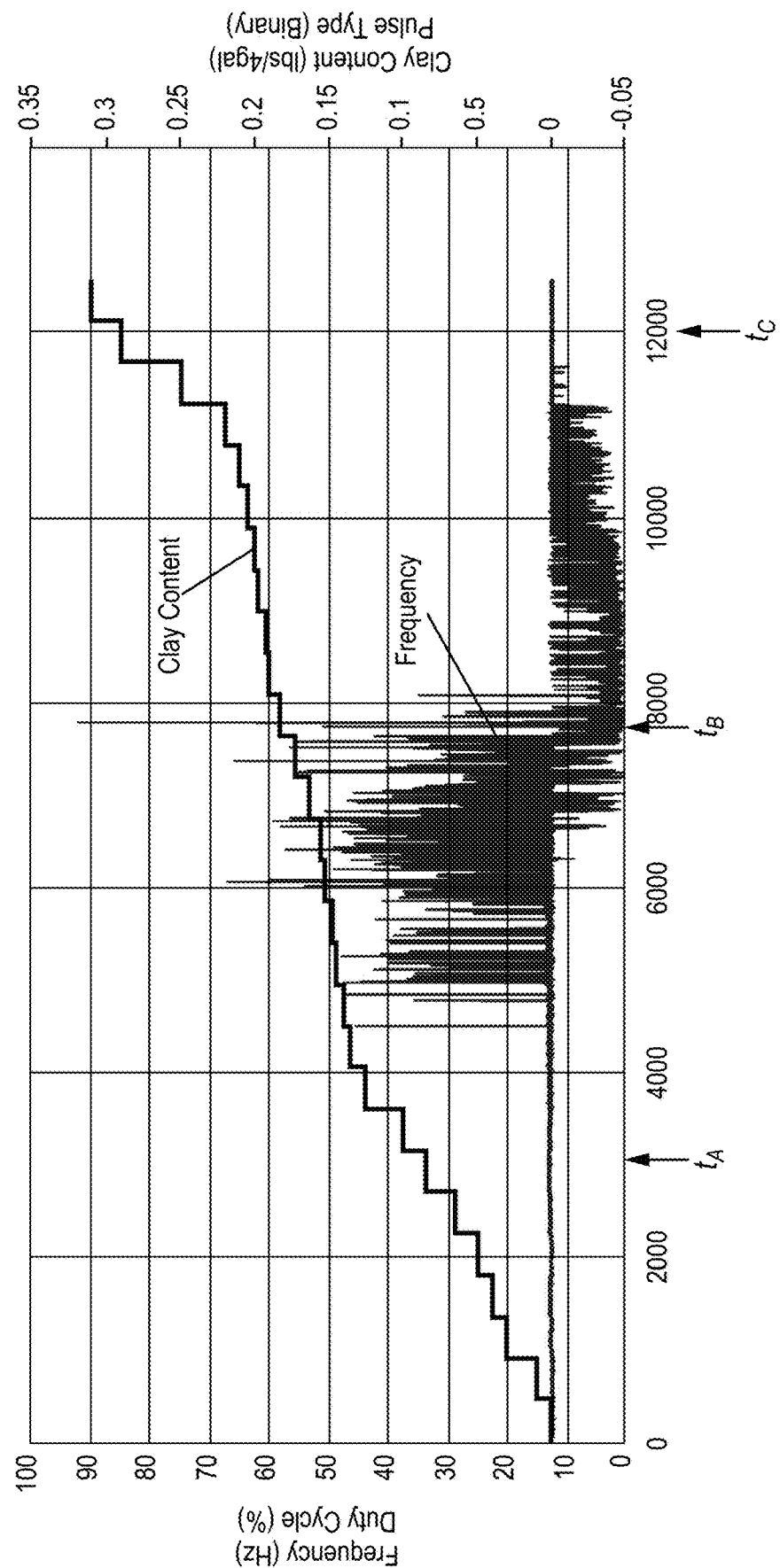
FIG. 3 is a graph of frequency measurements of a uniform projectile revolving around an axis within a sensor system against varying fluid clay content.

FIG. 3 is a graph depicting frequency measurements of a uniform projectile, such as projectile 30, rotating within an optical sensor section of a sensor system, such as optical sensor section 12.

In FIG. 3, the x-axis displays samples by sample number, such that the sample number increases over time. The left y-axis displays the rotation frequency of projectile 30 as a function of the duty cycle. It should be understood that the duty cycle can be interpreted as the percentage of time per revolution that a target, such as projectile 30, is detected by the optical sensor. If the target travels within the drum housing at a constant rate, the duty cycle will be the same percentage as the proportion of the target's circumferential length to the inner circumference of the drum (in this case, approximately 12%, as described in more detail below in reference to FIGS. 5A-5B). The right y-axis displays the clay content of a fluid passing through the sensor system. Projectile 30 travels within the sensor system at a constant rate (which corresponds to a duty cycle of approximately 12%) by fixing the flow rate within the sensor system.

At time $t_A$ (approximately sample 3,000), the test fluid has a clay content of approximately 0.1 pounds for every four gallons of fluid (0.1 lbs./4 gal. fluid) (3.0 grams of clay per liter of fluid (g/l)). This is a low clay-content fluid, which is fairly transparent. At this clay content, the optical sensor detects a duty cycle of approximately 12%. As shown in FIG. 3, the optical sensor detects a duty cycle of about 12% for samples between sample 1 and approximately sample 4,500, which correlates to an approximate clay content of between 0 and 0.13 lbs. per 4 gallons fluid (0-0.13 lbs./4 gal. fluid) (0-3.9 g/l).

At time $t_B$ (approximately sample 7,750), the test fluid has a clay content of approximately 0.17 lbs./4 gal. fluid (5.1 g/l). This is a medium clay-content fluid. At this clay content, the optical sensor detects a duty cycle of over 90%. As shown in FIG. 3, the optical sensor does not provide an accurate reading of the duty cycle between approximately samples 4,500-11,500, which correlates to an approximate clay content of 0.13-0.22 lbs./4 gal. fluid (3.9-6.6 g/l). This clay-content range causes a blind spot for the optical sensor with respect to the location of projectile 30 during projectile 30's rotation, where the optical sensor cannot accurately measure the flow rate of the fluid.

At time $t_C$ (approximately sample 12,000), the test fluid has a clay content of approximately 0.29 lbs./4 gal. fluid (8.7 g/l). This is a high clay-content fluid, which is fairly opaque. At this clay content, the optical sensor detects a duty cycle of approximately 12%. As shown in FIG. 3, the optical sensor detects a duty cycle of about 12% for samples between approximately sample 11,500-13,000, which correlates to an approximate clay content of 0.22-0.31 lbs./4 gal. fluid (6.6-9.3 g/l).

Figure 4A:
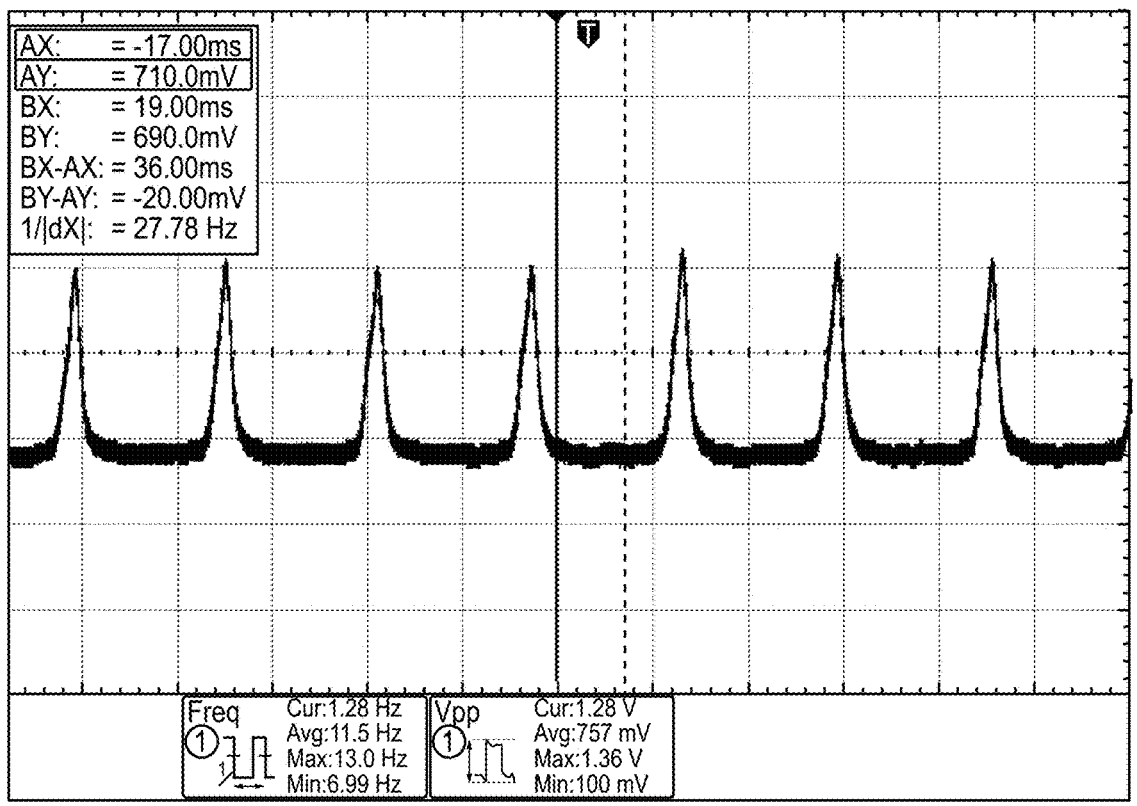
FIG. 4A is a graph of an optical signature of the uniform projectile of FIG. 3 at a time $t_A$ (low fluid clay content).
Figure 4B:
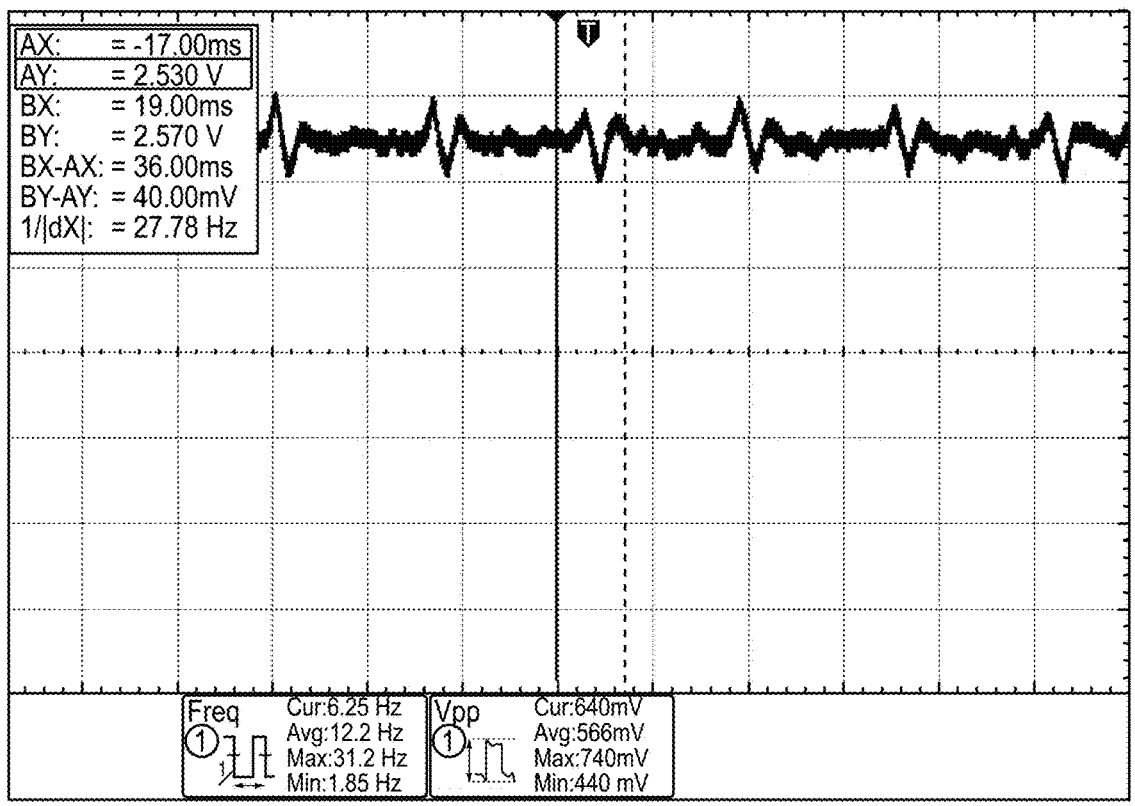
FIG. 4B is a graph of an optical signature of the uniform projectile of FIG. 3 at a time $t_B$ (medium fluid clay content).
Figure 4C:
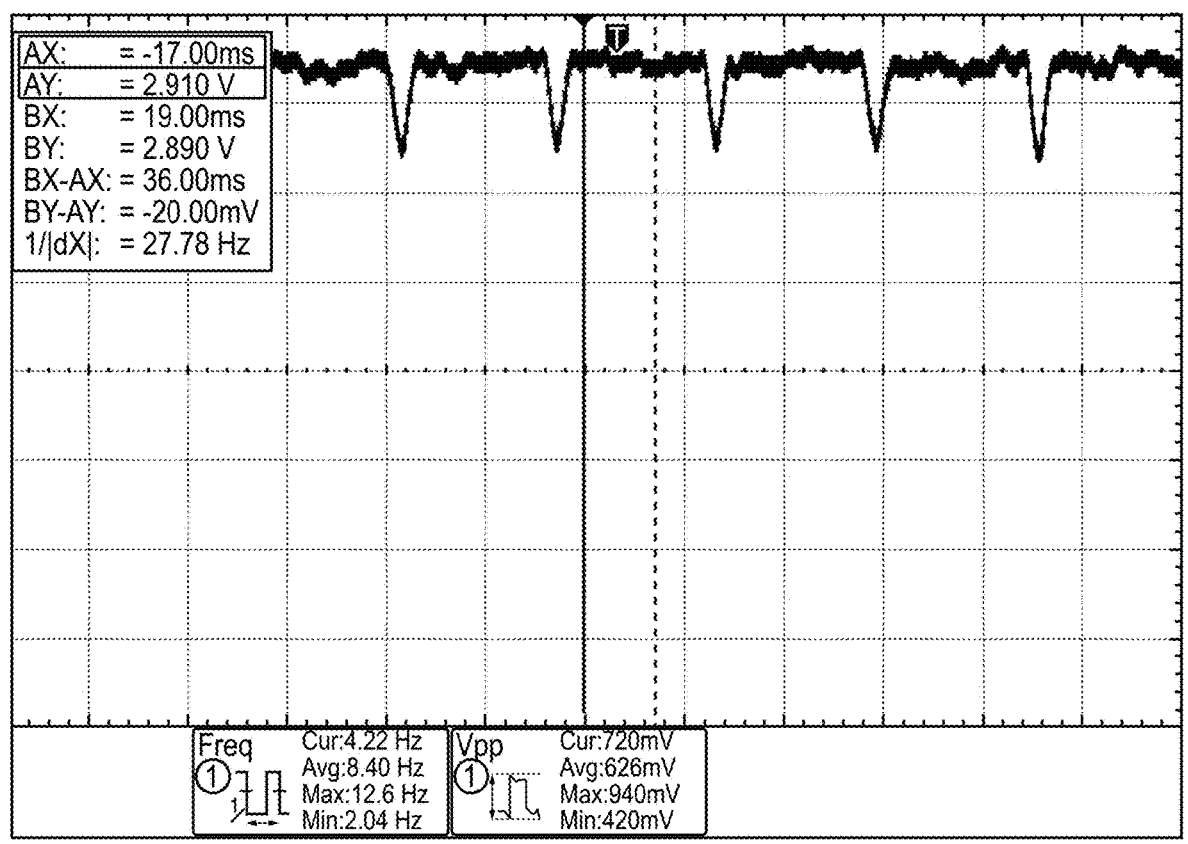
FIG. 4C is a graph of an optical signature of the uniform projectile of FIG. 3 at a time $t_C$ (high fluid clay content).

FIGS. 4A-4C are graphs showing optical signatures of projectile 30 at different times correlating to different fluid clay contents.

FIG. 4A shows an optical signature of projectile 30 at time $t_A$ shown in FIG. 3 (low fluid clay content). In FIG. 4A, an oscilloscope displays the optical signature of projectile 30 based on input data from optical sensor 26. A target (such as projectile 30) having a higher absorption rate than the test fluid will generate a signal in the form of a peak. The height of the peak corresponds to the magnitude of the difference between the absorption rate of the target and the absorption rate of the test fluid. A uniform projectile which has a higher absorption rate (and, conversely, a lower transmittance rate) than the fluid will therefore produce an optical signature composed of distinct peaks. At time $t_A$, projectile 30 has a higher opacity than the low clay-content fluid, producing an optical signature containing peaks. The signal-to-noise ratio at this level of clay content is high enough to produce a clear optical signature.

FIG. 4B shows an optical signature of projectile 30 at time $t_B$ shown in FIG. 3 (medium fluid clay content). This level of fluid clay content, as described above in reference to FIG. 3, causes inaccurate measurements of the position of projectile 30 within sensor system 10. At this level of fluid clay content, the absorption rate of target 30 is closer to the absorption rate of the test fluid than in FIG. 4A, and any peaks/troughs present are not large enough to reliably distinguish from noise. The signal-to-noise ratio at this level of clay content is too low to produce a clear optical signature.

FIG. 4C shows an optical signature of projectile 30 at time $t_C$ shown in FIG. 3 (high fluid clay content). In FIG. 4C, an oscilloscope displays the optical signature of projectile 30. A target having a lower absorption rate than the test fluid will generate a signal in the form of a trough. The depth of the trough corresponds to the magnitude of the difference between the absorption rate of the target and the absorption rate of the test fluid. A uniform projectile which has a lower absorption rate (i.e., higher transmittance rate) than the fluid will therefore produce an optical signature composed of distinct troughs. At time $t_C$, projectile 30 has a lower opacity than the high clay-content fluid, producing an optical signature containing troughs. As in FIG. 4A, the signal-to-noise ratio at this level of clay content is high enough to produce a clear optical signature.

Figure 5A:
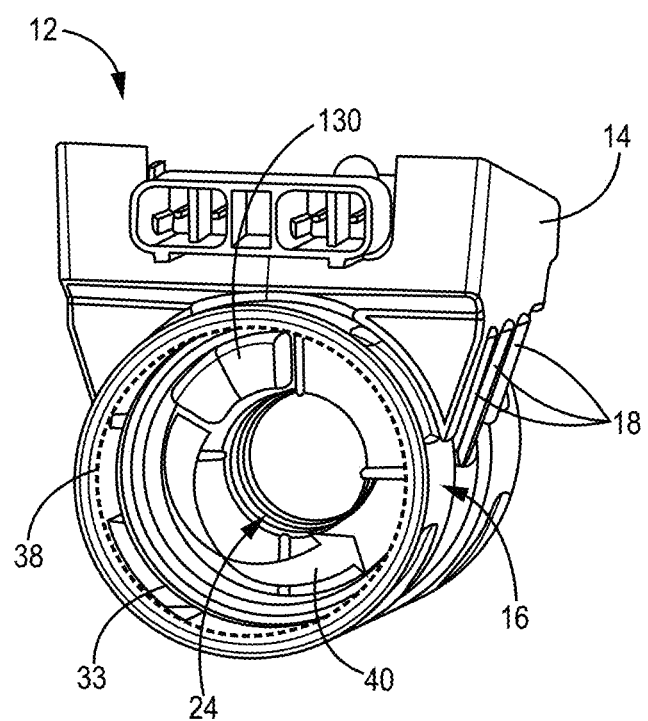
FIG. 5A is a first perspective view of a portion of the sensor system of FIG. 1A.
Figure 5B:
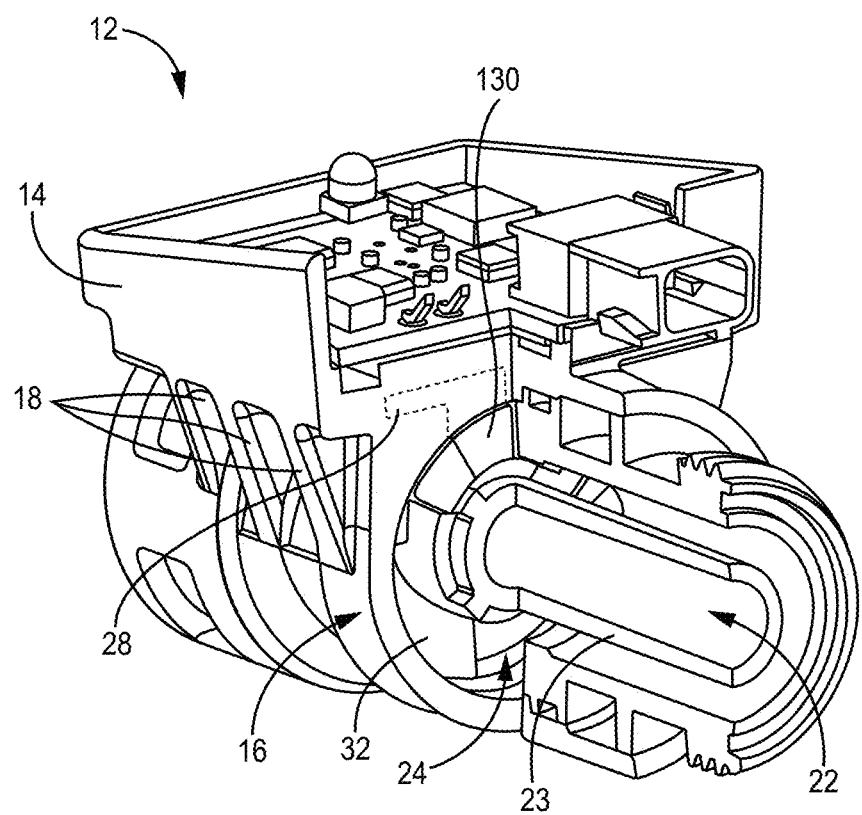
FIG. 5B is a second perspective view of the portion of the sensor system of FIG. 1A.
Figure 6A:
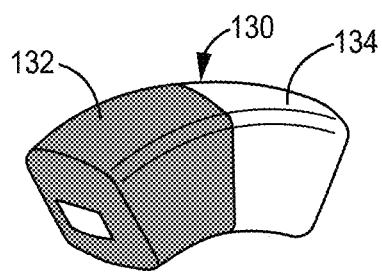
FIG. 6A is a front perspective view of a bi-sectional projectile.
Figure 6B:
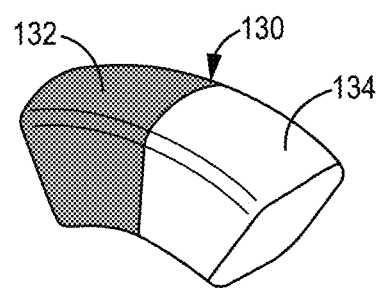
FIG. 6B is a back perspective view of the bi-sectional projectile of FIG. 6A.

FIGS. 5A-5B are rear perspective views of optical sensor section 12 and drum housing 16, with projectile 130 therein. FIG. 6A-6B are perspective views of projectile 130. Projectile 130 includes opaque section 132 and translucent section 134.

Optical sensor section 12 and drum housing 16 have the structure and design as discussed above in reference to FIGS. 1A-2. In the depicted embodiment, projectile 130 is a bi-sectional projectile. Projectile 130 can have an arc shape and can form an arc which is approximately one-eighth (approximately 12%) of inner circumference 38 of drum housing 16. Opaque section 132 and translucent section 134 can each make up approximately one half of projectile 130 such that approximately one half of projectile 130 is opaque and approximately one half of projectile 130 is translucent. Projectile 130 can be configured to rotate about a rotational axis. During operation of the sprayer, the revolution axis of projectile 130 can be oriented around axis S-S. Other designs of bi-sectional projectiles are possible, such as a projectile which is half black and half white, half opaque and half transparent, and other possible combinations.

When fluid flows through the sensor system 10, projectile 130 travels along a portion of the vortex flow path 24 such that projectile 130 revolves around axis S-S along the inner circumference of drum housing 16. A portion of the vortex flow path 24 is represented by arrow 40 shown in FIG. 5A. As described above in reference to FIGS. 1A-2, the flow of fluid through drum housing 16 causes the rotation of projectile 130 about axis S-S. Fluid impinges against projectile 130 and causes movement of projectile 130. Interior walls 32 can be configured to allow projectile 130 to rotate within a particular section of drum housing 16 and prevent movement of projectile 130 to points further downstream.

Projectile 130 rotates within drum housing 16 in substantially the same way as projectile 30 (described above in reference to FIGS. 1A-1B). Opaque section 132 has a higher optical absorption value than translucent section 134, which generates a distinct optical signature and raises the signal-to-noise ratio relative to a uniform projectile.

Figure 7:
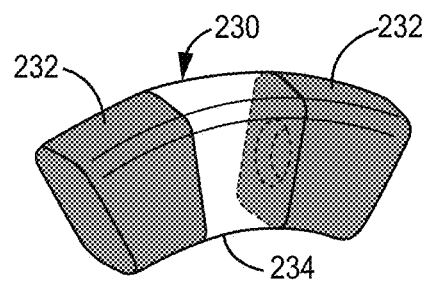
FIG. 7 is a perspective view of a tri-sectional projectile.

FIG. 7 is a perspective view of another projectile 230. Projectile 230 is a tri-sectional projectile which includes opaque sections 232 and translucent section 234. Each opaque section 232, as well as translucent section 234, can make up approximately one third of projectile 230 such that approximately one third of projectile 230 is translucent and approximately two thirds of projectile 230 are opaque. It should be understood that different embodiments of projectile 230 having two or more sections which have different absorption/transmittance rates relative to each other are possible (different color sections, etc.). Projectile 230 can have an arc shape.

Projectile 230 is configured to revolve around an axis within a drum housing, such as drum housing 16 shown in FIGS. 1A-2. The shape of projectile 230 and the vortex flow path 24 defined by interior walls 32 within drum housing 16 drive the revolution of projectile 230 around axis S-S. Projectile 230 is configured to revolve in substantially the same way as projectile 30 and projectile 130 within sensor system 10.

Opaque section 232 has a first absorption rate, and translucent section 234 has a second absorption rate. Opaque section 232 has a higher absorption rate and lower transmittance rate than translucent section 234. During operation, optical sensor 26 shown in FIGS. 1A-2 can detect the difference in absorption between opaque section 232 and translucent section 234. This absorption difference allows optical sensor 26 to accurately measure the frequency of projectile 230 within drum housing 16 at low, medium, and high fluid clay content levels.

Figure 8B:
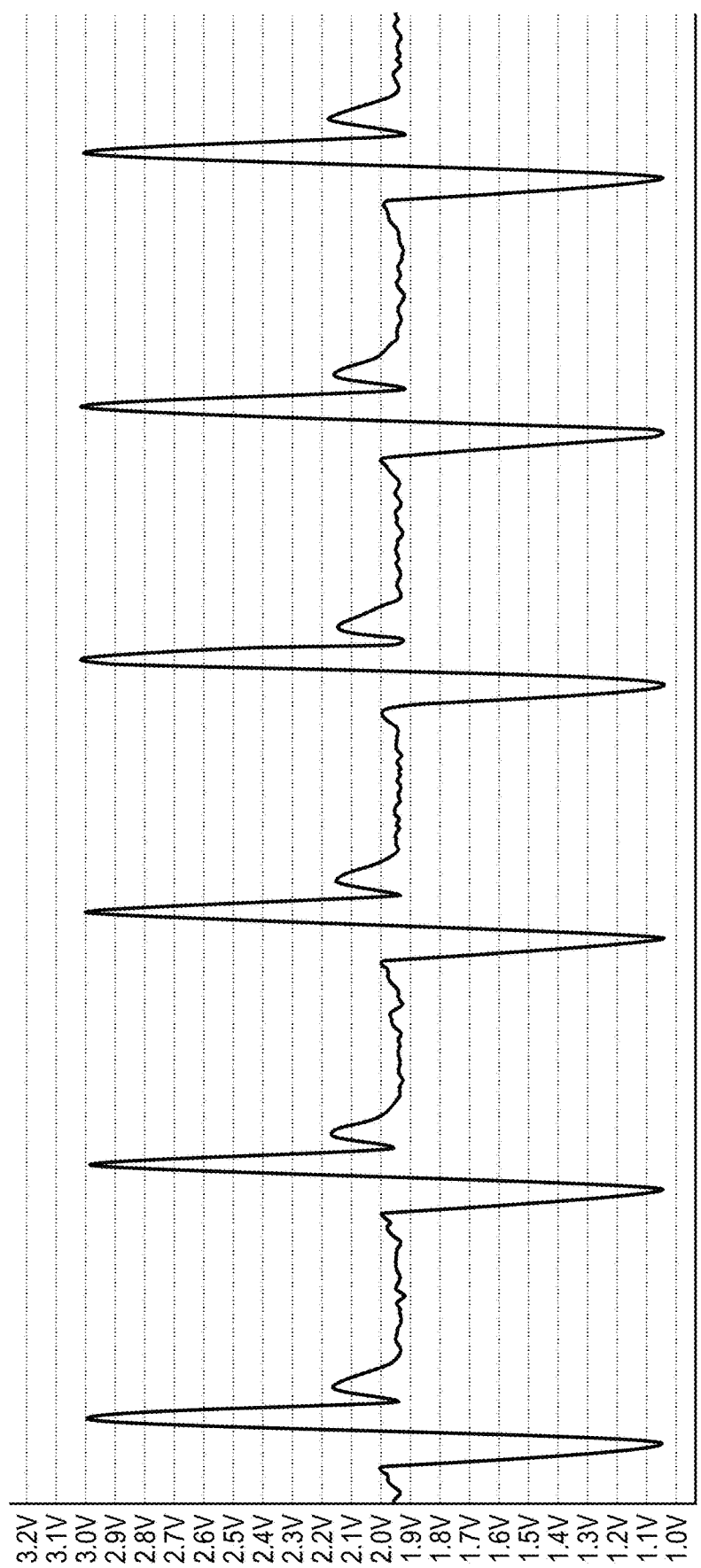
FIG. 8B is a graph of an oscilloscope reading of the bi-sectional projectile of FIG. 6A in a fluid with a low clay content.
Figure 8C:
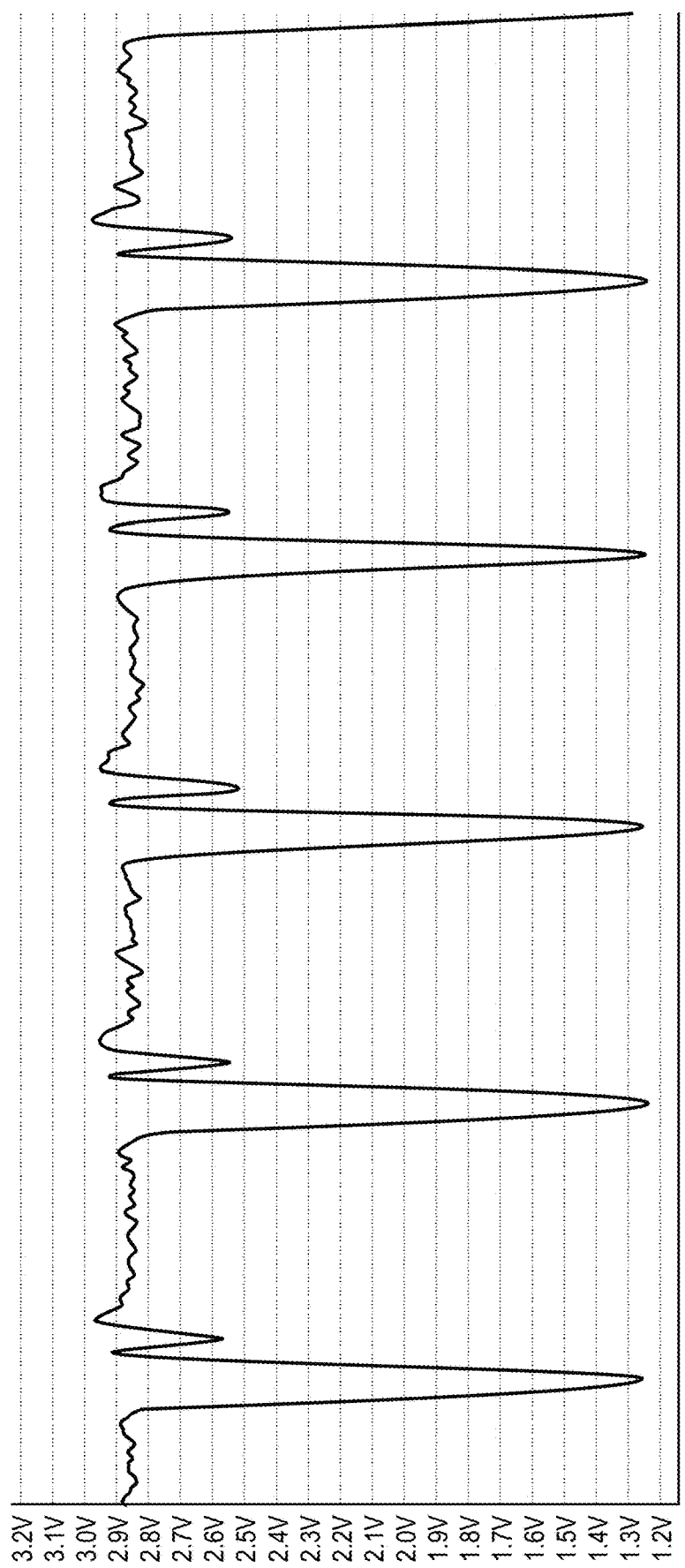
FIG. 8C is a graph of an oscilloscope reading of the bi-sectional projectile of FIG. 6A in a fluid with a medium clay content.
Figure 8D:
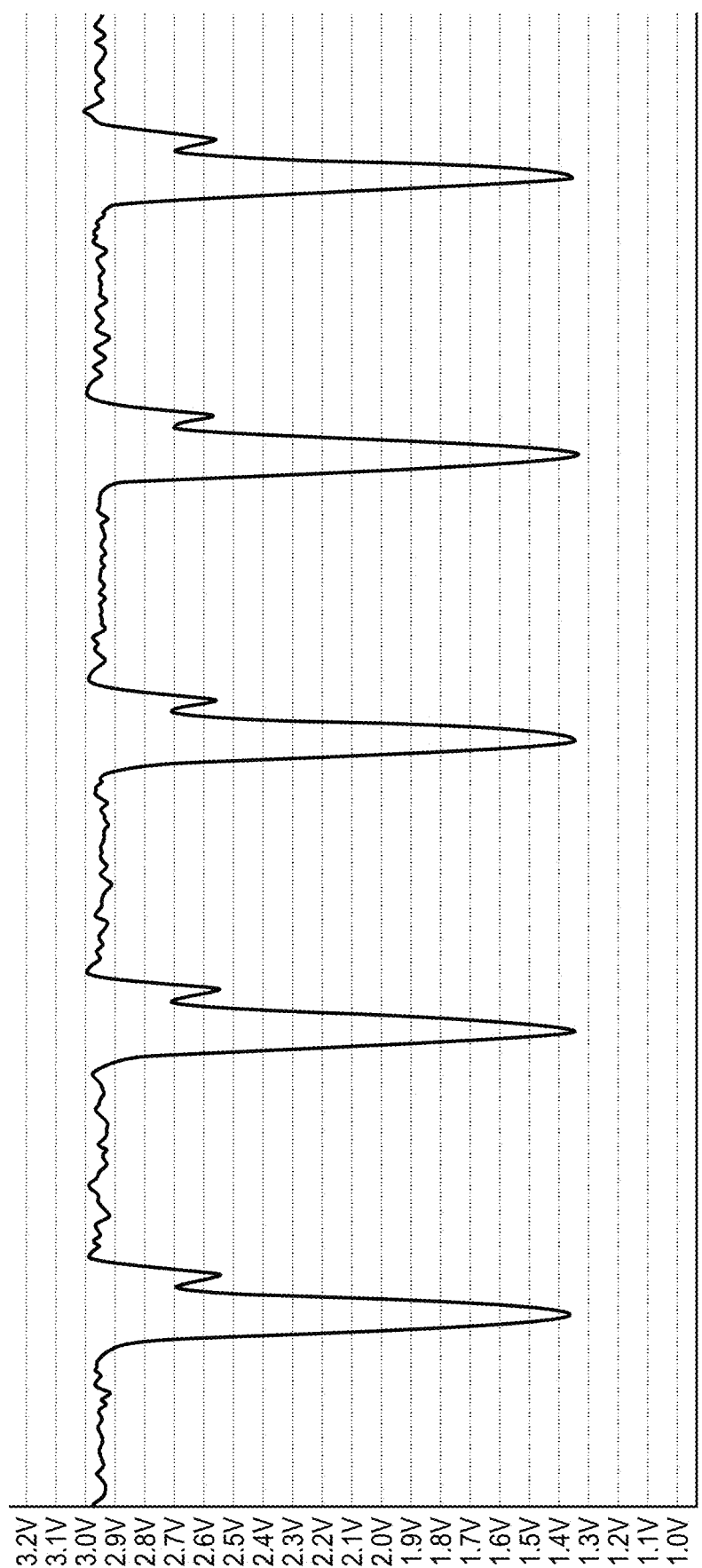
FIG. 8D is a graph of an oscilloscope reading of the bi-sectional projectile of FIG. 6A in a fluid with a high clay content.

FIG. 8A is an oscilloscope reading showing optical sensor measurements of projectile 130 when a clear fluid is run through sensor system 10. FIG. 8B is an oscilloscope reading showing optical sensor measurements of projectile 130 when a medium clay-content fluid is run through sensor system 10. FIG. 8C is an oscilloscope reading showing optical sensor measurements of projectile 130 when a high clay-content fluid is run through sensor system 10. FIG. 8D is an oscilloscope reading showing optical sensor measurements of projectile 130 when a very high clay-content fluid is run through sensor system 10. FIGS. 8A-8D will be discussed in turn below. As discussed above in reference to FIGS. 4A-4C, a target having a higher absorption rate than the test fluid will generate a signal in the form of a peak, a target having a lower absorption rate than the test fluid will generate a trough, and the size of the peak/trough corresponds to the magnitude of the difference between the absorption rate of the target and the absorption rate of the test fluid.

FIG. 8A depicts a similar optical signature as shown in FIG. 4A. FIG. 8A depicts an optical signature produced by projectile 130 in a clear fluid (clay content of 0.0 lbs./4 gal. fluid) (0.0 g/l). Both opaque section 132 and translucent section 134 have a higher absorption rate than the clear fluid, so the measurements from optical sensor 26 produce an optical signature comprised of a series of peaks (i.e., an optical signature similar to the one shown in FIG. 4A). Translucent section 134 produces the shorter peaks shown in FIG. 8A, and opaque section 132 produces the larger peaks. This is due to the larger difference in absorption rate between the clear fluid and opaque section 132 than between the clear fluid and translucent section 134.

FIG. 8B depicts an optical signature produced by projectile 130 in a fluid with a medium clay content (similar to time $t_B$ described above in reference to FIGS. 3 and 4B). The medium clay-content fluid has a clay content of approximately 0.16 lbs./4 gal. fluid (4.8 g/l). However, due to the difference in absorption rates between opaque section 132 and translucent section 134, the movement of projectile 130 in the medium clay content fluid generates a clear optical signature with a high signal-to-noise ratio. As shown in FIG. 8B, the optical signature is comprised of a series of distinct, alternating troughs and peaks. There are slight troughs and peaks between each distinct trough/peak due to noise, but the resulting optical signature shown in FIG. 8B is clearer than the optical signature shown in FIG. 4B.

FIG. 8C depicts an optical signature produced by projectile 130 in a fluid having a high clay content (similar to time $t_c$ described above in reference to FIGS. 3 and 4C). The high clay-content fluid has a clay content of approximately 0.4 lbs./4 gal. fluid (12.0 g/l). FIG. 8D depicts an optical signature produced by projectile 130 in a fluid having a very high clay content. The very high clay-content fluid has a clay content of approximately 0.76 lbs./4 gal. fluid (22.8 g/l). Translucent section 134 has a lower absorption rate than the high clay-content fluid, and so the measurements from optical sensor 26 produce an optical signature comprised of a series of troughs (i.e., an optical signature similar to the one shown in FIG. 4C).

It should be understood that projectile 230 (described above in reference to FIG. 7) will operate in substantially the same way as projectile 130 over a range of fluid opacities (i.e., projectile 230 will also produce a clear optical signature at low, medium, and high fluid clay-content levels). A tri-sectional projectile such as projectile 230 will produce an optical signature which corresponds to the three sections of the tri-sectional projectile. For example, when projectile 230 is within a clear fluid, projectile 230 would produce an optical signature having a repeating series of three peaks as opposed to the repeating series of two peaks shown in FIG. 8A. The optical signature produced by projectile 230 would show two larger peaks (corresponding to each opaque section 232) surrounding each small peak (corresponding to translucent section 234).

Figure 9:
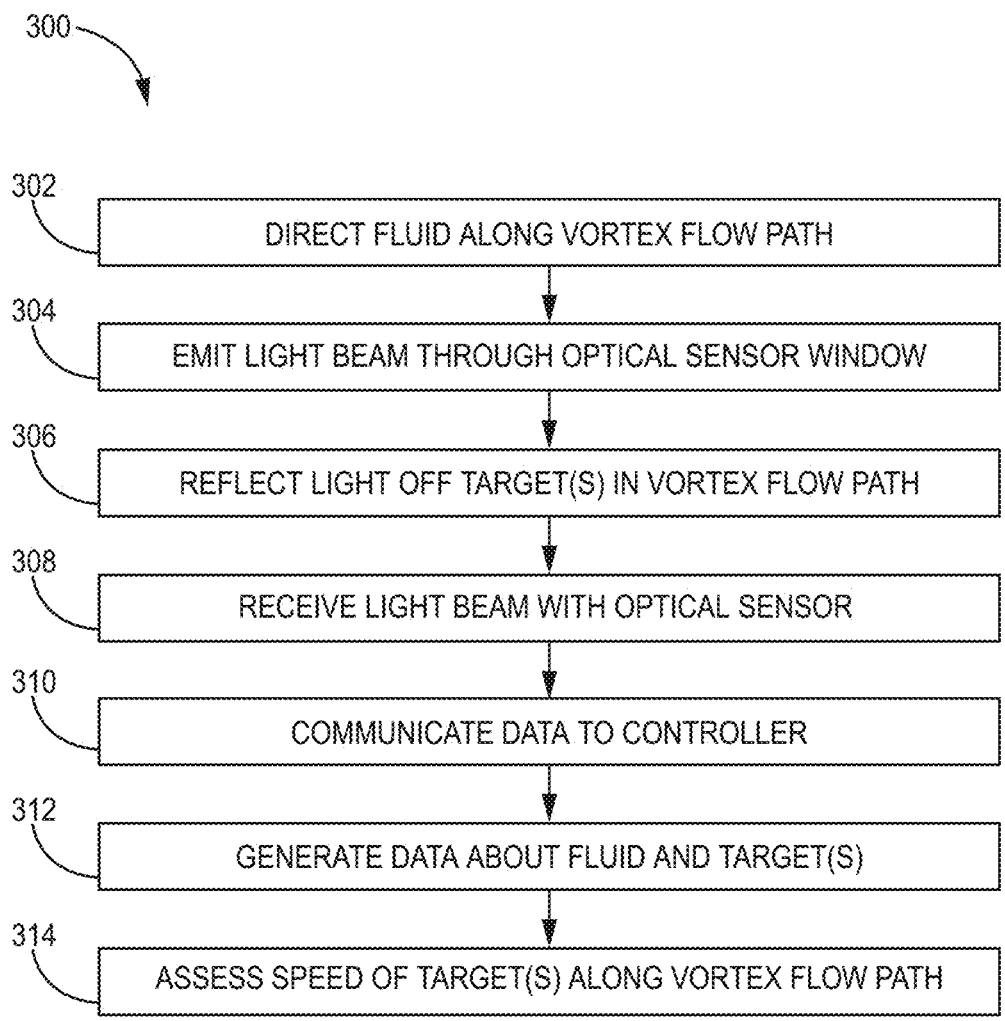
FIG. 9 illustrates a method of testing an optical flow rate sensor system for a sprayer.

FIG. 9 illustrates method 300 of testing an optical flow rate sensor system (such as optical sensor section 12) for a sprayer. Method 300 includes acts 302-314.

In act 302, a drum housing of a sensor system (such as drum housing 16 within sensor system 10) directs fluid within the drum housing along a vortex flow path within the drum housing. As described in detail above, the shape of the drum housing causes the fluid to travel along the vortex flow path. The movement of the fluid along the vortex flow path also drives revolution of a projectile, such as projectiles 30, 130, 230 around the axis (i.e., along a portion of the vortex flow path).

In act 304, an optical sensor (such as optical sensor 26) emits a light beam through an optical sensor window (such as optical sensor window 28). At least a portion of the light beam passes through the fluid within the drum housing. A source of the optical sensor can be configured to emit the light beam.

In act 306, the light beam is reflected off of a target located within the drum housing. This target can be, for example, opaque section 132 and/or translucent section 134 of projectile 130, or opaque sections 232 and/or translucent section 234 of projectile 230.

In act 308, the optical sensor receives the light beam reflected off the target through the fluid in the drum housing. A detector of the optical sensor can be configured to receive the light beam. The portion of light received by the optical sensor can vary based on the opacity of the fluid and/or target.

In act 310, the optical sensor communicates data about the fluid and the target to a controller (which, as described above in reference to FIGS. 1A-1B, can be a processor or other component of the optical sensor). This data can include, for example, information about the target's movement within the drum housing, absorption/transmittance data of the target, and absorption/transmittance data of the fluid.

In act 312, the controller generates absorption and transmittance data about the target and the fluid. The controller can calculate, for example, the amount of light emitted by the source that was received by the source.

In act 314, the controller assesses a speed of the target along the vortex flow path (i.e., a speed of revolution). The speed of the target along the vortex flow path will typically correspond to the flow rate of the fluid along the vortex flow path. The speed of the target can be found by, for example, calculating the frequency of the target's revolution. The controller can, for example, convert the target's speed of revolution within the drum housing to a linear speed of the fluid, and calculate the flow rate of the fluid.

Using a multi-sectional projectile within an optical sensor system for a sprayer provides several advantages. The use of a projectile allows measurement of the flow rate through the sprayer using an optical sensor. The multi-sectional projectile facilitates accurate readings across a range of fluid opacities and allows for precise calibration of the optical sensor. Revolution of the projectile is facilitated (especially at low and high fluid flow rates) by pre-vortexing of fluid via vortexing geometry of interior walls upstream of the projectile. This pre-vortexed flow contacts the projectile along a partially circumferential vector. The pre-vortexed flow efficiently drives the projectile and enables the optical sensor as a whole to generate accurate measurements of flow rate using the projectile (which is more reliable than with unvortexed, purely axial fluid flow). Because a tri-sectional projectile will produce a different optical signature than a bi-sectional projectile, the use of a tri-sectional projectile can facilitate more accurate sensor calibration in some applications. Finally, the use of a multi-sectional projectile is cost-effective and increases ease of use of the optical sensor system.

The following are non-exclusive descriptions of possible embodiments.

An embodiment of an optical flow rate sensor system for an agricultural sprayer includes a drum housing, a central passage housing, an optical sensor, an optical sensor window, and a projectile. The drum housing and central passage housing together define a first flow path comprising a first portion generally parallel to an axis and a second vortex portion around the axis. The optical sensor is disposed facing the axis. The optical sensor window is within a display housing and is disposed between the axis and the optical sensor. The projectile comprises a first section having a first optical absorption value and a second section having a second optical absorption value that is lower than the first optical absorption value. The projectile is configured to revolve around the axis when fluid flows through the first flow path.

The central passage housing may optionally define a second flow path generally parallel to, and in an opposite direction of, the first flow path. The projectile can have an arc shape.

The first section of the projectile can make up a first half of the projectile and the second section can make up a second half of the projectile.

The first section may be a first opaque section and the second section may be a translucent section.

In some embodiments, the projectile further comprises a second opaque section. The translucent section is positioned between the first opaque section and the second opaque section.

In some embodiments, the drum housing comprises an inner surface and at least one interior wall which is extends from the inner surface. The interior wall extends circumferentially about a circumference of the inner surface and axially parallel to the axis such that the interior wall defines the second vortex portion of the first flow path.

An embodiment of a method of testing an optical flow rate sensor system for an agricultural sprayer includes directing, with a drum housing and a central passage housing, a fluid along a vortex flow path within the drum housing and around an axis. A projectile revolves within the drum housing and around the axis. An optical sensor emits a light beam through an optical sensor window, through the fluid, and toward an axis. A portion of the light beam is reflected off of the projectile. The optical sensor receives the portion of the light beam reflected off of the projectile. The optical sensor communicates data about the reflected light to a controller. The controller generates transmittance data and absorption data about the fluid and the projectile. The controller assesses a speed of the projectile about the axis to calculate a flow rate of the fluid along the vortex flow path.

In some embodiments, the fluid is directed along the vortex flow path such that the fluid drives revolution of the projectile around the axis within the drum housing.

In some embodiments, reflecting the light beam off of the target comprises reflecting the light beam off of a first section of the projectile and a second section of the projectile, wherein the first section has a first optical absorption value and the second section has a second optical absorption value that is lower than the first optical absorption value. Transmittance data and/or absorption data may be generated about each of the first section and the second section.

In a further embodiment, an optical signature of the target is analyzed. For example, data about the portion of the light beam reflected off of the projectile may be communicated to an oscilloscope.

A further embodiment includes communicating, with the controller, the flow rate of the fluid along the vortex flow path, to a display.

A further embodiment includes displaying, with the display, the flow rate of the fluid along the vortex flow path.

The invention claimed is:

1. An optical flow rate sensor system for an agricultural sprayer, the system comprising:
a drum housing and a central passage housing together defining a first flow path comprising a first portion generally parallel to an axis and a second vortex portion around the axis, wherein the drum housing and the central passage housing together define the first flow path outside the central passage housing;
an optical sensor disposed facing the axis;
an optical sensor window within a display housing and disposed between the axis and the optical sensor; and
a projectile within the drum housing, wherein the projectile comprises a first section having a first optical absorption value and a second section having a second optical absorption value that is lower than the first optical absorption value;
wherein the projectile is configured to revolve around the axis when fluid flows through the first flow path.

2. The optical flow rate sensor system of claim 1, wherein the central passage housing defines a second flow path generally parallel to, and in an opposite direction of, the first flow path.

3. The optical flow rate sensor system of claim 1, wherein the projectile has an arc shape.

4. The optical flow rate sensor system of claim 1, wherein the first section of the projectile comprises an opaque material and the second section of the projectile comprises a translucent material.

5. The optical flow rate sensor system of claim 1, wherein the first section makes up a first half of the projectile and the second section makes up a second half of the projectile.

6. The optical flow rate sensor system of claim 1, wherein the projectile further comprises a third section having the first optical absorption value, and wherein the second section is positioned between the first section and the third section.

7. An optical flow rate sensor system for an agricultural sprayer, the system comprising:
a drum housing and a central passage housing together defining a first flow path comprising a first portion generally parallel to an axis and a second vortex portion around the axis:
an optical sensor disposed facing the axis;
an optical sensor window within a display housing and disposed between the axis and the optical sensor; and
a projectile within the drum housing, wherein the projectile comprises a first section having a first optical absorption value and a second section having a second optical absorption value that is lower than the first optical absorption value;
wherein the projectile is configured to revolve around the axis when fluid flows through the first flow path:
wherein the drum housing comprises:
an inner surface; and
at least one interior wall which extends from the inner surface;
wherein the interior wall extends circumferentially about a circumference of the inner surface and axially parallel to the axis such that the interior wall defines the second vortex portion of the first flow path.

8. A method of testing an optical flow rate sensor system for an agricultural sprayer, the method comprising:
directing, with a drum housing and a central passage housing, a fluid along a vortex flow path within the drum housing and around an axis, wherein the drum housing and the central passage housing together define the vortex flow path outside the central passage housing;
revolving a projectile within the drum housing and around the axis;
emitting, with an optical sensor, a light beam through an optical sensor window, through the fluid, and toward the axis;
reflecting a portion of the light beam off of the projectile;
receiving, with the optical sensor, the portion of the light beam reflected off of the projectile;
communicating, with the optical sensor, data about the reflected light to a controller;
generating, with the controller, transmittance data and absorption data about the fluid and the projectile; and
assessing, with the controller, a speed of the projectile about the axis to calculate a flow rate of the fluid along the vortex flow path.

9. The method of claim 8, wherein directing, with the drum housing and central passage housing, the fluid along the vortex flow path and around the axis, comprises directing the fluid along the vortex flow path such that the fluid drives revolution of the projectile around the axis within the drum housing.

10. The method of claim 8, wherein:
reflecting a portion of the light beam off of the projectile comprises reflecting the light beam off of a first section of the projectile and a second section of the projectile, wherein the first section has a first optical absorption value and the second section has a second optical absorption value that is lower than the first optical absorption value; and
generating, with the controller, transmittance data and absorption data about the fluid and the projectile comprises generating at least one of transmittance data and absorption data about each of the first section and the second section.

11. The method of claim 8, wherein generating, with the controller, transmittance data and absorption data about the fluid and the projectile comprises analyzing an optical signature of the projectile.

12. The method of claim 11, wherein analyzing the optical signature of the projectile comprises communicating, with the optical sensor, data about the portion of the light beam reflected off of the projectile to an oscilloscope.

13. The method of claim 8, further comprising communicating, with the controller, the flow rate of the fluid along the vortex flow path, to a display.

14. The method of claim 13, further comprising displaying, with the display, the flow rate of the fluid along the vortex flow path.

15. An optical flow rate sensor system for an agricultural sprayer, the system comprising:
a drum housing and a central passage housing together defining a first flow path comprising a first portion generally parallel to an axis and a second vortex portion around the axis:
an optical sensor disposed facing the axis;
an optical sensor window within a display housing and disposed between the axis and the optical sensor; and
a projectile within the drum housing, wherein the projectile has an arc shape and comprises a first section having a first optical absorption value and a second section having a second optical absorption value that is lower than the first optical absorption value;
wherein the projectile is configured to revolve around the axis when fluid flows through the first flow path and has a circumferential length approximately one eighth of a circumferential length of the second vortex portion of the drum housing.

16. A method of testing an optical flow rate sensor system for an agricultural sprayer, the method comprising:
   directing, with a drum housing and a central passage housing, a fluid along a vortex flow path within the drum housing and around an axis;
   revolving a projectile within the drum housing and around the axis;
   emitting, with an optical sensor, a light beam through an optical sensor window, through the fluid, and toward the axis:
   reflecting a portion of the light beam off of the projectile;
   receiving, with the optical sensor, the portion of the light beam reflected off of the projectile;
   communicating, with the optical sensor, data about the reflected light to a controller;
   generating, with the controller, transmittance data and absorption data about the fluid and the projectile: and
   assessing, with the controller, a speed of the projectile about the axis to calculate a flow rate of the fluid along the vortex flow path
   wherein directing, with the drum housing and central passage housing, the fluid along the vortex flow path and around the axis, comprises directing the fluid along the vortex flow path around the central passage housing and within the drum housing.

\* \* \* \* \*